(12) United States Patent
Singh et al.

(10) Patent No.: US 10,455,162 B2
(45) Date of Patent: Oct. 22, 2019

(54) IMAGING PIXELS WITH STORAGE CAPACITORS

(71) Applicant: SEMICONDUCTOR COMPONENTS INDUSTRIES, LLC, Phoenix, AZ (US)

(72) Inventors: Gurvinder Singh, Bangalore (IN); Anirudh Oberoi, Bangalore (IN); Bharat Balar, Bengaluru (IN); Sundaraiah Gurindagunta, Vijayawada (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/914,122

(22) Filed: Mar. 7, 2018

(65) Prior Publication Data
US 2019/0230294 A1    Jul. 25, 2019

(30) Foreign Application Priority Data

Jan. 23, 2018  (IN) .............................. 201811002698

(51) Int. Cl.
| | |
|---|---|
| *H04N 5/335* | (2011.01) |
| *H04N 5/243* | (2006.01) |
| *H04N 5/235* | (2006.01) |
| *H04N 5/232* | (2006.01) |
| *H04N 5/367* | (2011.01) |
| *H04N 5/361* | (2011.01) |

(Continued)

(52) U.S. Cl.
CPC ........... *H04N 5/243* (2013.01); *H04N 5/2353* (2013.01); *H04N 5/2358* (2013.01); *H04N 5/23241* (2013.01); *H04N 5/3559* (2013.01); *H04N 5/3598* (2013.01); *H04N 5/361* (2013.01); *H04N 5/363* (2013.01); *H04N 5/367* (2013.01)

(58) Field of Classification Search
CPC ........................... H04N 5/243; H04N 5/23241
USPC ......................................................... 348/294
See application file for complete search history.

(56) References Cited

U.S. PATENT DOCUMENTS

2015/0055002 A1*  2/2015  Beck .................... H04N 5/3559
                                                          348/308
2017/0244921 A1*  8/2017  Velichko ........... H01L 27/14627

OTHER PUBLICATIONS

Akahane et al., "A Sensitivity and Linearity Improvement of a 100-dB Dynamic Range CMOS Image Sensor Using a Lateral Overflow Integration Capacitor," IEEE Journal of Solid-State Circuits, vol. 41, No. 4, Apr. 2006.

(Continued)

*Primary Examiner* — Usman A Khan
(74) *Attorney, Agent, or Firm* — Treyz Law Group, P.C.; Joseph F. Guihan

(57) ABSTRACT

An image sensor may include an array of imaging pixels and row control circuitry. Each imaging pixel may include a photodiode, a floating diffusion region, a transfer transistor configured to transfer charge from the photodiode to the floating diffusion region, a dual conversion gain transistor coupled to the floating diffusion region, and a storage capacitor coupled to the dual conversion gain transistor. The capacitor may have a plate that receives a modulated control signal and the row control circuitry may be configured to modulate the control signal. To reduce image artifacts, the modulated control signal may be modulated low during the integration time of the pixel and may be modulated high during the high conversion gain readout time of the pixel.

18 Claims, 4 Drawing Sheets

(51) Int. Cl.
*H04N 5/363* (2011.01)
*H04N 5/355* (2011.01)
*H04N 5/359* (2011.01)

(56) References Cited

OTHER PUBLICATIONS

Akahane et al., "Optimum Design of Conversion Gain and Full Well Capacity in CMOS Image Sensor With Lateral Overflow Integration Capacitor," IEEE Transactions on Electron Devices, vol. 56, No. 11, Nov. 2009.

* cited by examiner

IMAGING PIXELS WITH STORAGE CAPACITORS

BACKGROUND

This relates generally to imaging devices, and more particularly, to imaging sensor pixels that include a storage capacitor.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Column circuitry is coupled to each pixel column for reading out pixel signals from the image pixels. The column circuitry often implements a correlated double sampling (CDS) procedure, which involves obtaining pixel signals by computing the difference between reset signals sampled during reset operations and image signals sampled following charge transfer operations.

Conventional image sensors may have images with artifacts associated with strong light exposure. The eclipse phenomenon occurs when at least some pixels are exposed to strong light such as direct illumination from the sun. The strong light may cause the floating diffusion to leak, which results in an erroneous reset signal being sampled (i.e., reset signals sampled during reset operations may exhibit voltage levels that are less than the desired reset level). Consequently, the pixel signal computed via CDS becomes an undesirably small value, the effect of which is manifested when an over-illuminated pixel appears dark when it should be bright. Conventional image sensors may suffer from additional artifacts caused by fixed pattern noise and dark current.

Some image sensors may include a storage capacitor. In some circumstances, image sensors with a storage capacitor may suffer from high temporal noise, dark signal non-uniformity (e.g., fixed pattern noise in dark lighting conditions), and dark current during integration.

It would therefore be desirable to provide improved imaging pixels for image sensors.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
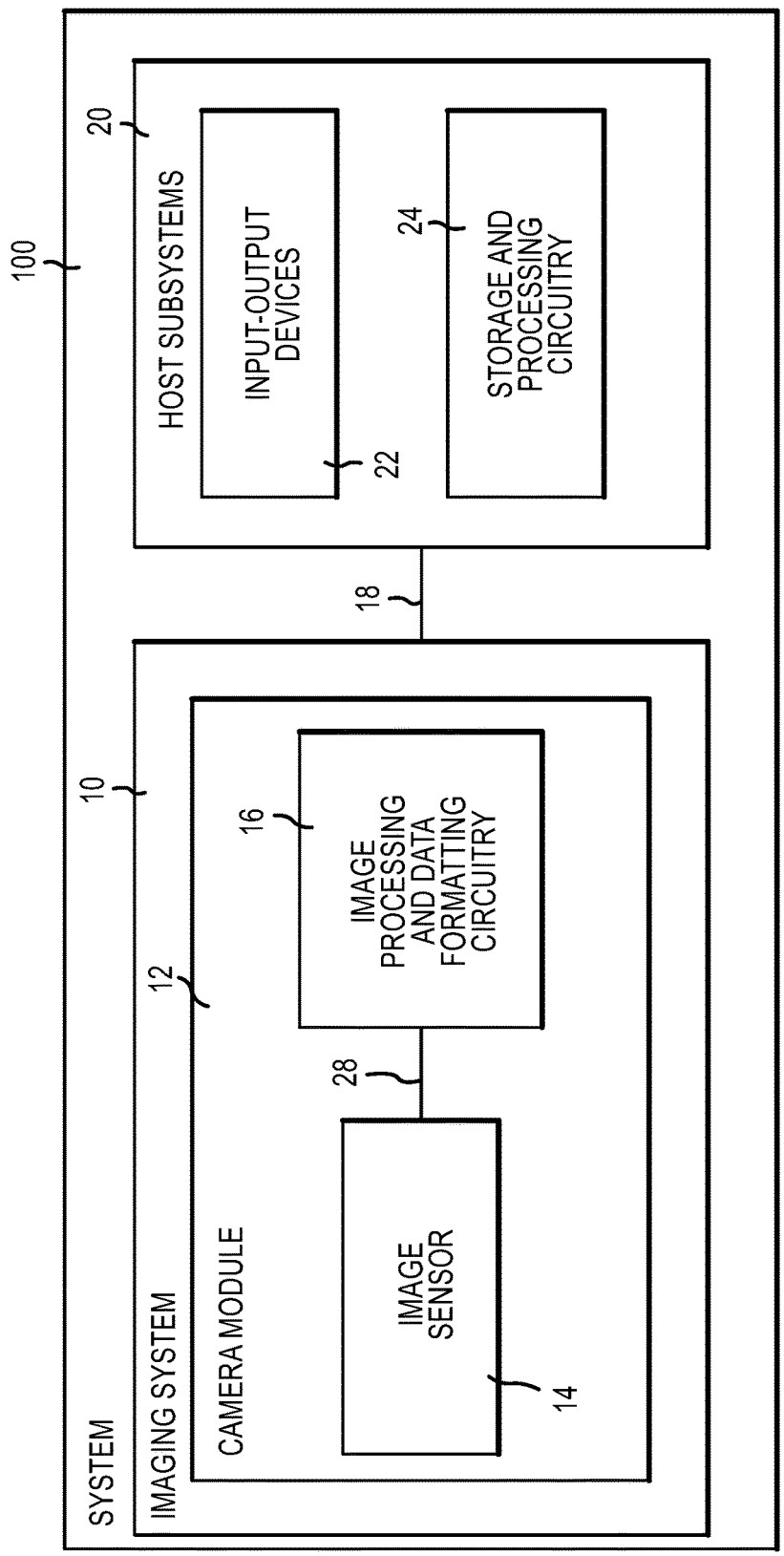
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

System 100 may be a vehicle safety system. In a vehicle safety system, images captured by the image sensor may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc. In at least some instances, an image sensor may form part of a semi-autonomous or autonomous self-driving vehicle. Vehicle safety standards may require that the proper operation of any component of a vehicle safety system (including the image sensor) be verified before, during, and/or after operation of the vehicle. Verification operations for the image sensor may be performed by the imaging system prior to and/or after operation of a vehicle (e.g., upon startup and/or shutdown of the imaging system).

Figure 2:
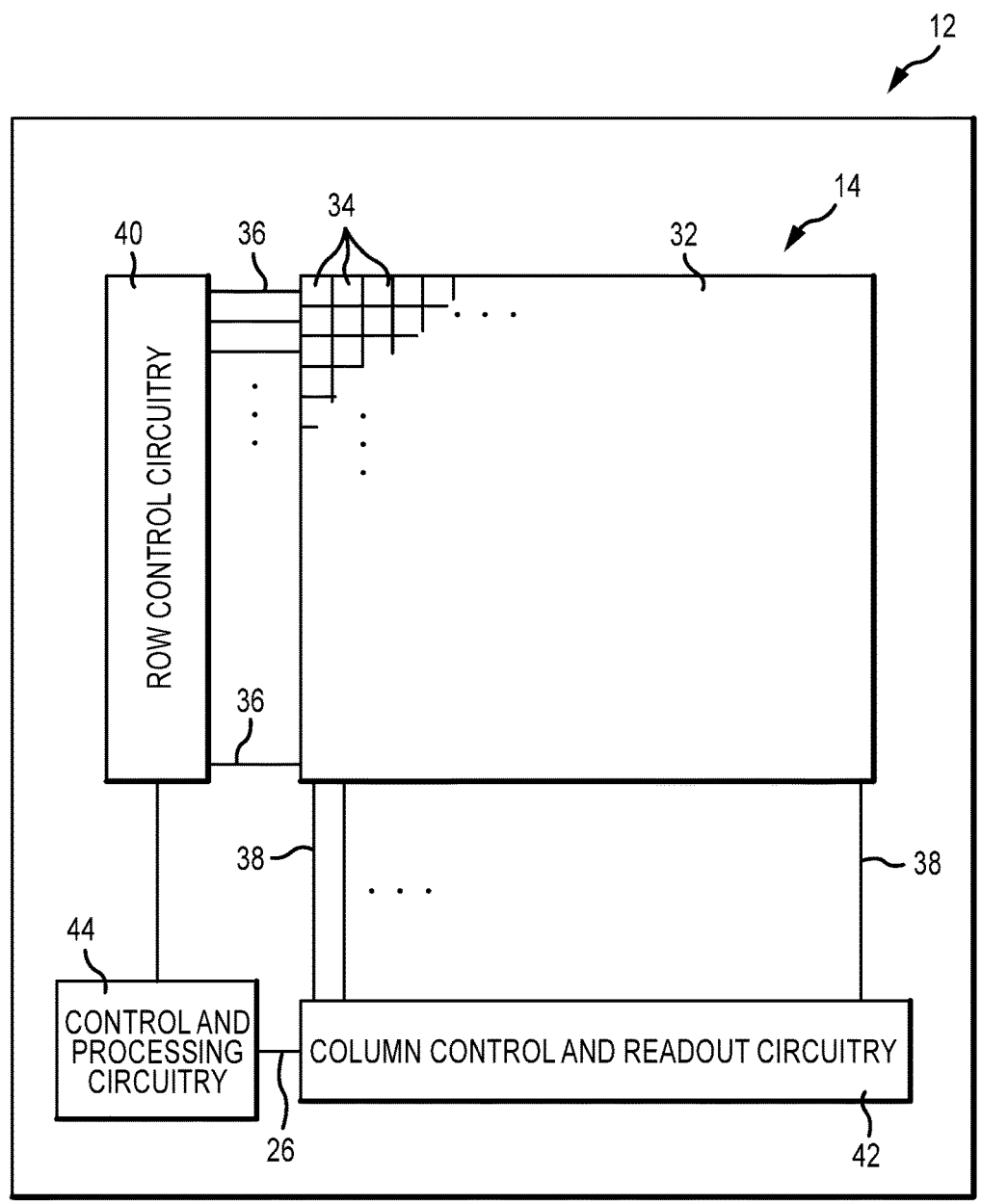
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels, imaging pixels, or image pixels 34). Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

If desired, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any known metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

Figure 3:
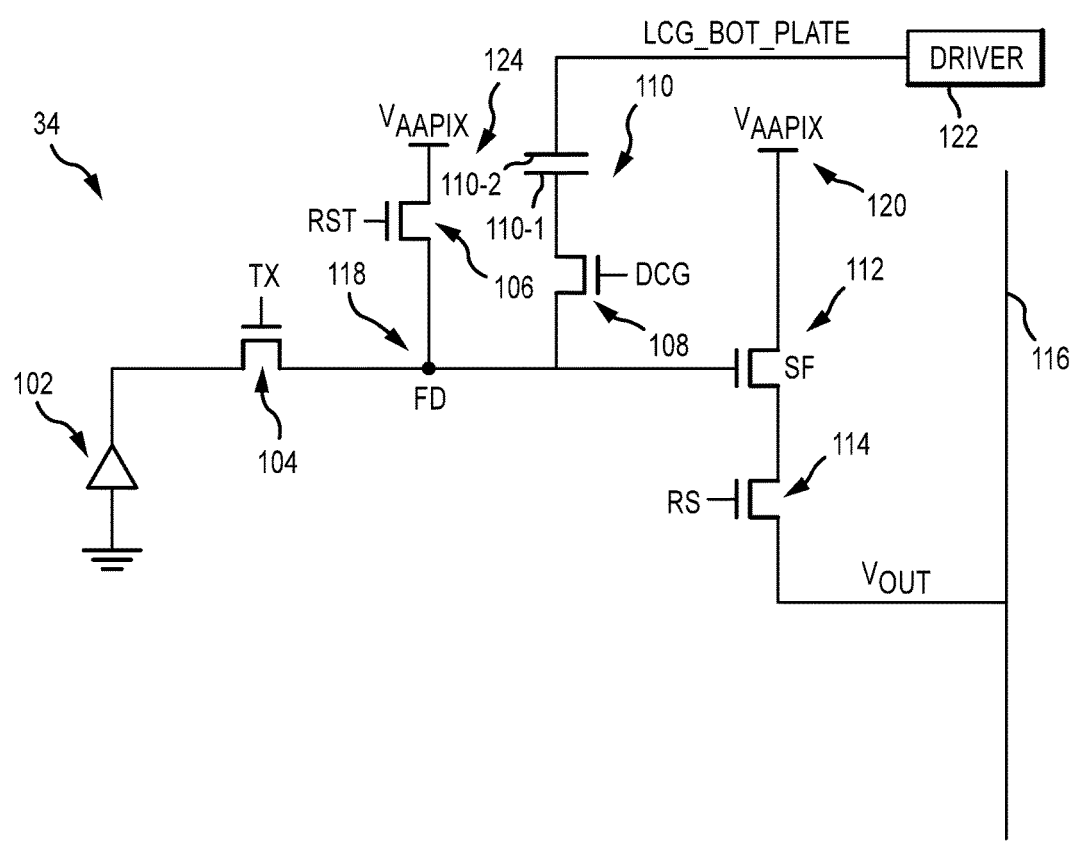
FIG. 3 is a circuit diagram of an illustrative imaging pixel with a storage capacitor having a plate that receives a modulated control signal in accordance with an embodiment.

FIG. 3 is a circuit diagram of an imaging pixel having a photosensitive element and a storage capacitor. As shown in FIG. 1, image pixel 34 includes photosensitive element 102 (e.g., a photodiode). Photosensitive element 102 has a first terminal that is coupled to ground. The second terminal of photosensitive element 102 is coupled to transfer transistor 104. Transfer transistor 104 is coupled to floating diffusion (FD) region 118. A reset transistor 106 may be coupled between floating diffusion region 118 and voltage supply 124. Floating diffusion region 118 may be a doped semiconductor region (e.g., a region in a silicon substrate that is doped by ion implantation, impurity diffusion, or other doping process). Floating diffusion 118 has an associated capacitance. Gain select transistor 108 has a first terminal coupled to floating diffusion region 118 and a second terminal coupled to dual conversion gain capacitor 110 (sometimes referred to as storage capacitor 110). Dual conversion gain capacitor 110 may have a first plate 110-1 (sometimes referred to as an upper plate or top plate) coupled to the second terminal of the gain select transistor. Dual conversion gain capacitor 110 may have a second plate 110-2 (sometimes referred to as a lower plate or bottom plate) that receives a modulated capacitor plate signal (LCG_BOT_PLATE) from driver 122. The modulated capacitor plate signal (e.g., control signal) may be modulated up or down at various points during pixel operations to prevent image artifacts.

Source-follower transistor 112 has a gate terminal coupled to floating diffusion region 118 and a first terminal of gain select transistor 108. Source-follower transistor 112 also has a first source-drain terminal coupled to voltage supply 120. Voltage supplies 120 and 124 may both provide a power supply voltage ($V_{AAPIX}$). The power supply voltage at power supplies 120 and 124 may be the same or may be different. In this application, each transistor is illustrated as having three terminals: a source, a drain, and a gate. The source and drain terminals of each transistor may be changed depending on how the transistors are biased and the type of transistor used. For the sake of simplicity, the source and drain terminals are referred to herein as source-drain terminals or simply terminals. A second source-drain terminal of source-follower transistor 112 is coupled to column output line 116 through row select transistor 114.

A gate terminal of transfer transistor 104 receives control signal TX. A gate terminal of gain select transistor 108 receives control signal DCG. A gate terminal of reset transistor 106 receives control signal RST. A gate terminal of row select transistor 114 receives control signal RS. Control signals TX, DCG, RST, RS may be provided by row control circuitry (e.g., row control circuitry 40 in FIG. 2) over control paths (e.g., control paths 36 in FIG. 2). Driver 122, which provides control signal LCG_BOT_PLATE, may be a part of the row control circuitry (e.g., row control circuitry 40 in FIG. 2). There may be one driver 122 per row, as an example. Drivers 122 may provide control signals LCG_BOT_PLATE over control paths such as control paths 36 in FIG. 2.

Gain select transistor 108 and dual conversion gain capacitor 110 may be used by pixel 34 to implement a dual conversion gain mode. In particular, pixel 34 may be operable in a high conversion gain mode and in a low conversion gain mode. If gain select transistor 108 is disabled, pixel 34 will be placed in a high conversion gain mode. If gain select transistor 108 is enabled, pixel 34 will be placed in a low conversion gain mode. When gain select transistor 108 is turned on, the dual conversion gain capacitor 110 may be switched into use to provide floating diffusion region 118 with additional capacitance. This results in lower conversion gain for pixel 34. When gain select transistor 108 is turned off, the additional loading of the capacitor is removed and the pixel reverts to a relatively higher pixel conversion gain configuration.

Figure 4:
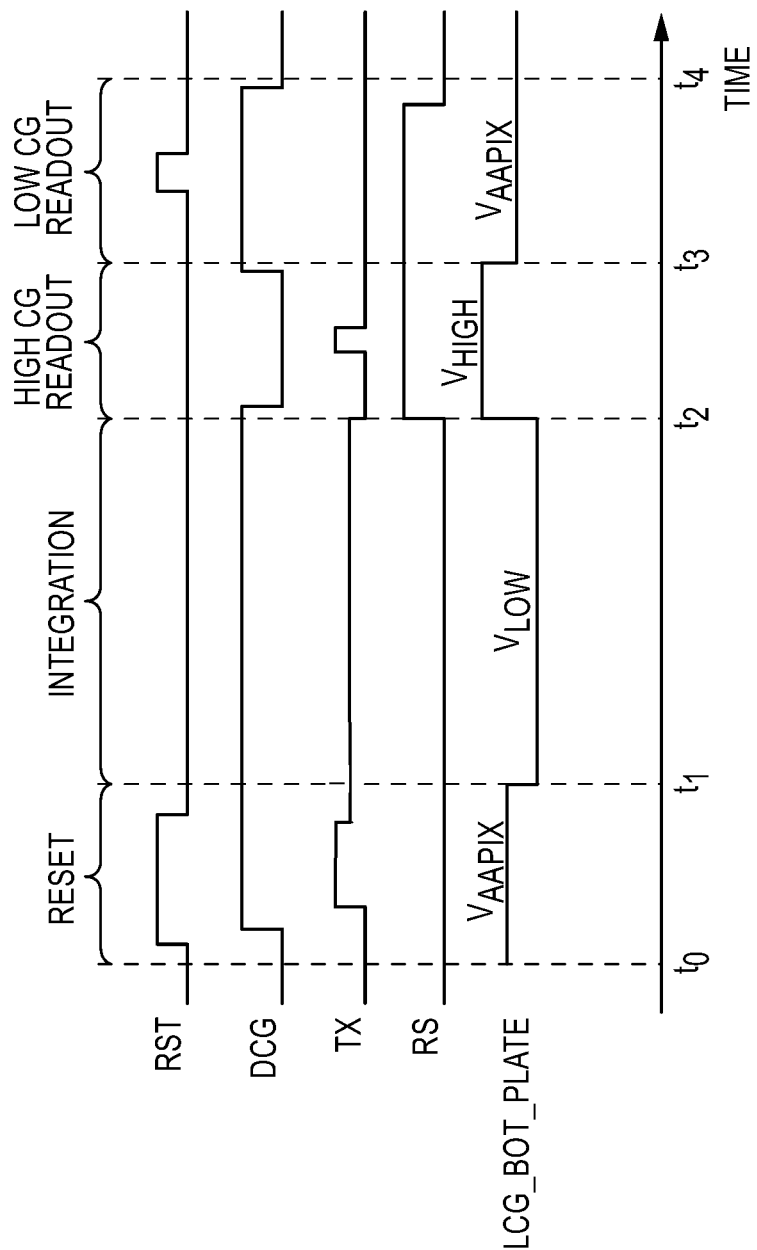
FIG. 4 is a timing diagram showing illustrative operations of an imaging pixel of the type shown in FIG. 3 in accordance with an embodiment.

An illustrative timing diagram for operating pixel 34 in FIG. 3 is shown in FIG. 4. A reset period may occur from $t_0$ to $t_1$. During the reset period, the reset control signal RST, dual conversion gain control signal DCG, and transfer transistor control signal TX may be asserted. Therefore, reset transistor 106, gain select transistor 108, and transfer transistor 104 are asserted. When reset transistor 106, gain select transistor 108, and transfer transistor 104 are asserted, photodiode 102, floating diffusion region 118, and storage capacitor 110 are reset to a baseline voltage level (e.g., $V_{AAPIX}$).

The integration period (sometimes referred to as a shutter period) may occur between $t_1$ and $t_2$. During the integration period, photodiode 102 may generate charge (e.g., electrons) in response to receiving impinging photons. The amount of charge that is collected by photodiode 102 depends on the intensity of the impinging light and the exposure duration (or integration time).

Dual conversion gain control signal DCG may remain asserted during the integration period. Consequently, gain select transistor 108 is asserted and charge that overflows from photodiode 102 will be stored in storage capacitor 110. Charge may overflow from photodiode 102 if a certain charge threshold is exceeded. The level of transfer transistor control signal TX during the integration period may determine the amount of accumulated charge required to overflow photodiode 102 and transfer transistor 104. The level of transfer transistor control signal TX during the integration period ($t_1$-$t_2$) may be an intermediate level that is lower than the high level associated with the transfer transistor being asserted (e.g., during the reset period) and higher than the low level associated with the transfer transistor being deasserted (e.g., during the low conversion gain readout period).

Between $t_2$ and $t_3$, a high conversion gain readout may be performed. Row select control signal RS (and accordingly, row select transistor 114) may be asserted during the high conversion gain readout (and subsequent low conversion gain readout). Control signal DCG may be deasserted during the high conversion gain readout period, leading to gain select transistor 108 being deasserted and the pixel being placed in a high conversion gain mode. During the high conversion gain readout, charge accumulated in the photodiode may be sampled. As shown, control signal TX may be raised to assert transfer transistor 104 and transfer charge from photodiode 102 to floating diffusion region 118. The amount of charge present in floating diffusion region 118 may be sampled before and after the assertion of control signal TX. The amount of charge sampled before the assertion of control signal TX may be a reference signal. The reference signal may be compared to the amount of charge sampled after the assertion of control signal TX to determine how much charge was stored in the photodiode.

Between $t_3$ and $t_4$, a low conversion gain readout may be performed. The gain select transistor may be asserted by raising control signal DCG (placing the imaging pixel in the low conversion gain mode). Because the gain select transistor is asserted, charge stored in storage capacitor 110 will be sampled during the low conversion gain readout. Reset transistor 106 may be asserted (by raising control signal RST) during the low conversion gain readout period. The amount of charge present may be sampled before and after asserting the reset transistor. Reading out the charge collected by the storage capacitor and the reset value allows for noise and/or dark current compensation (e.g., through subtraction operations). These subtraction operations may be referred to as double sampling. Since reset voltage level readout occurs after signal readout, the double sampling readout is with uncorrelated noise (e.g., the double sampling readout is not a correlated double sampling readout). However, the double sampling readout may still reduce noise levels compared to reading out the signal level alone.

During the reset period and the low conversion gain readout period, control signal LCG_BOT_PLATE may be the same voltage as the voltage provided by voltage supplies 120 and 124 (e.g., $V_{AAPIX}$). This example is merely illustrative, and control signal LCG_BOT_PLATE may be at any desired bias voltage (not just $V_{AAPIX}$) during the reset period and the low conversion gain readout period. Additionally, the control signal LCG_BOT_PLATE may be equal to different voltages in the reset period and the low conversion gain readout period. For example, LCG_BOT_PLATE may be equal to a first voltage (which may or may not be equal to $V_{AAPIX}$) during the reset period and may be equal to a second voltage (which may or may not be equal to $V_{AAPIX}$) that may or may not be different from the first voltage during the low conversion gain readout period. During the integration period and the high conversion gain readout period, LCG_BOT_PLATE may be modulated.

During the integration period, LCG_BOT_PLATE may be modulated down (e.g., negative modulation) to reduce leakage during integration. During the negative modulation, the potential at the floating diffusion region 118 is reduced. For example, take a scenario where $V_{AAPIX}$ is equal to 2.8V and LCG_BOT_PLATE is equal to $V_{AAPIX}$ during the reset period. During the reset period ($t_0$-$t_1$), LCG_BOT_PLATE may be equal to 2.8V. Then, at $t_1$, LCG_BOT_PLATE may be lowered to a different voltage ($V_{LOW}$). For example, LCG_BOT_PLATE may be lowered to 2.0V. Due to this negative modulation of LCG_BOT_PLATE, the floating diffusion voltage may drop from $V_{AAPIX}$ (2.8V) to approximately the voltage of LCG_BOT_PLATE (2.0V). The reduction in voltage at the floating diffusion region may be equal to $(V_{AAPIX}-V_{LOW}) \times C_{STORAGE}/(C_{STORAGE}+C_{FD})$, where $C_{STORAGE}$ is the capacitance of storage capacitor 110 and $C_{FD}$ is the capacitance of floating diffusion region 118. $C_{STORAGE}$ may be greater than $C_{FD}$. LCG_BOT_PLATE may be lowered to any desired voltage between $t_1$ and $t_2$ (e.g., 2.0V, 1.8V, greater than 1.0V, greater than 2.0V, greater than 1.5V, greater than 1.8V, less than 3.0V, less than 2.5V, less than 2.0V, less than 2.2V, less than 1.5V, between 1.8V and 2.2V, etc.). The voltage difference between $V_{AAPIX}$ (e.g., the voltage level of LCG_BOT_PLATE during the reset period) and $V_{LOW}$ may be about 0.8V, between 0.7V and 0.9V, between 0.5V and 1.5V, greater than 0.5V, less than 2.0V, etc.

Lowering the voltage of LCG_BOT_PLATE lowers the potential at floating diffusion region 118. Additionally, there is a reduction of reverse bias at the floating diffusion region, reducing leakage current due to Band-to-Band Tunneling (BTBT). Lowering LCG_BOT_PLATE during the integration period also mitigates dark signal non-uniformity (DSNU) and lowers dark current at the floating diffusion region 118. By reducing LCG_BOT_PLATE during the integration period, the temporal noise, fixed pattern noise (FPN) and dark current in the image is greatly reduced.

During the high conversion gain readout period, LCG_BOT_PLATE may be modulated up to prevent eclipse (e.g., when an over-illuminated pixel appears dark when it should be bright). By boosting LCG_BOT_PLATE during the high conversion gain readout period, there is a positive shift in the floating diffusion potential. The positive shift in the floating diffusion potential may approximately equal the difference between the low modulation voltage of LCG_BOT_PLATE and the high modulation voltage of LCG_BOT_PLATE. For example, take an example where the low modulation voltage ($V_{LOW}$) of LCG_BOT_PLATE is 2.0V and the high modulation voltage ($V_{HIGH}$) of LCG_BOT_PLATE is 3.0V. The difference between these two voltages is 1.0V. Therefore, if the floating diffusion has a voltage of 1.1V at $t_2$, the floating diffusion voltage may increase from 1.1V to 2.1V when LCG_BOT_PLATE is modulated from 2.0V to 3.0V. This increase in the floating diffusion voltage allows higher pixel swing during the high conversion gain readout. The high pixel output swing allows the column output line 116 to be clamped to a high voltage during reset sampling (ensuring the sampled reset level is not corrupted by high incident light levels). There is an increase in the dynamic range of the source follower transistor 112, thereby allowing the floating diffusion region to swing more before the onset of source-follower clipping. Boosting LCG_BOT_PLATE shifts the onset of the eclipse phenomenon to higher illumination levels, thereby preserving signal to noise ratios under bright conditions while maintaining good low light performance.

The example of $V_{HIGH}$ being 3.0V is merely illustrative. $V_{HIGH}$ may be any desired voltage (e.g., 3.2V, 3.4V, 3.1V, more than 2.9V, more than 3.0V, more than 3.2V, more than 3.5V, less than 3.5V, less than 3.2V, less than 3.1V, less than 3.0V, between 2.9V and 3.2V, etc.). The voltage difference between $V_{AAPIX}$ (e.g., the voltage level of LCG_BOT_PLATE during the low conversion gain readout period) and $V_{HIGH}$ may be about 0.2V, about 0.5V, about 0.3V, between 0.1V and 0.5V, less than 0.1V, greater than 0.1V, greater than 0.2V, between 0.1V and 0.3V, etc. The voltage difference between $V_{LOW}$ and $V_{HIGH}$ may be about 1.0V, about 0.8V, about 1.2V, greater than 0.5V, greater than 0.8V, greater than 1.0V, greater than 1.2V, greater than 1.5V, less than 0.5V, less than 0.8V, less than 1.0V, less than 1.2V, less than 1.5V etc.

The control signal LCG_BOT_PLATE is then modulated back down to $V_{AAPIX}$ (or another desired voltage) at $t_3$ for the low conversion gain readout period ($t_3$-$t_4$). When LCG_BOT_PLATE is modulated down from $V_{HIGH}$ to $V_{AAPIX}$ at $t_3$, the potential of the floating diffusion region may decrease. The voltage drop at the floating diffusion region may be approximately equal to the difference between $V_{HIGH}$ and $V_{AAPIX}$.

In various embodiments, an image sensor may include an array of imaging pixels and row control circuitry. Each imaging pixel may include a photodiode, a floating diffusion region, a transfer transistor configured to transfer charge from the photodiode to the floating diffusion region, and a capacitor coupled to the floating diffusion region. The capacitor may have a plate that receives a control signal and the row control circuitry may be configured to modulate the control signal.

The row control circuitry may be configured to modulate the control signal between a first voltage and a second voltage that is less than the second voltage. The row control circuitry may be configured to modulate the control signal between the first voltage, the second voltage, and a third voltage that is higher than the first voltage. The first voltage may be a power supply voltage. The row control circuitry may be configured to provide the control signal to a first imaging pixel of the array of imaging pixels at the first voltage during a reset period for the first imaging pixel and the row control circuitry may be configured to provide the control signal to the first imaging pixel at the second voltage during an integration period for the first imaging pixel. The row control circuitry may be configured to provide the control signal to the first imaging pixel at the third voltage during a high conversion gain readout period for the first imaging pixel and the row control circuitry may be configured to provide the control signal to the first imaging pixel at the first voltage during a low conversion gain readout period for the first imaging pixel.

The row control circuitry may include a plurality of drivers and each driver may be configured to provide the control signal to a respective row of imaging pixels in the array of imaging pixels. Each imaging pixel may include a transistor interposed between the capacitor and the floating diffusion region. Each imaging pixel may include a source follower transistor. The floating diffusion region may be coupled to a gate of the source follower transistor. Each imaging pixel may include a reset transistor coupled between the floating diffusion region and a voltage supply that supplies a power supply voltage. The row control circuitry may be configured to modulate the control signal from a first voltage to a second voltage, the first voltage may be equal to the power supply voltage, and the second voltage may be lower than the first voltage.

In various embodiments, an imaging pixel may include a photodiode, a transfer transistor coupled to the photodiode, a floating diffusion region coupled to the transfer transistor, a dual conversion gain transistor coupled to the floating diffusion region, and a storage capacitor having first and second plates. The transfer transistor may be configured to transfer charge from the photodiode to the floating diffusion region, the first plate may be coupled to the dual conversion gain transistor, the dual conversion gain transistor may be interposed between the floating diffusion region and the storage capacitor, and the second plate may receive a modulated control signal.

The imaging pixel may also include a source follower transistor. The floating diffusion region may be coupled to a gate of the source follower transistor and the dual conversion gain transistor may be coupled to a node that is interposed between the floating diffusion region and the gate of the source follower transistor. The imaging pixel may also include a reset transistor coupled between the floating diffusion region and a voltage supply that supplies a power supply voltage. The modulated control signal received by the second plate of the storage capacitor may be equal to the power supply voltage during a reset period and may be equal to a first voltage that is lower than the power supply voltage during an integration period. The modulated control signal may be equal to a second voltage that is greater than the power supply voltage during a high conversion gain readout period, and the dual conversion gain transistor may be deasserted during the high conversion gain readout period. The modulated control signal may be equal to the power supply voltage during a low conversion gain readout period, and the dual conversion gain transistor may be asserted during the low conversion gain readout period.

In various embodiments, a method of operating an imaging pixel that includes a photodiode, a floating diffusion region, a transfer transistor configured to transfer charge from the photodiode to the floating diffusion region, and a capacitor that is coupled to the floating diffusion region and that has a plate that receives a control signal may include resetting the floating diffusion region while the control signal is equal to a first voltage and collecting charge in the photodiode during an integration period after resetting the floating diffusion region and while the control signal is equal to a second voltage that is lower than the first voltage.

The method may also include, after collecting charge in the photodiode during the integration period and while the control signal is equal to a third voltage that is greater than the first voltage, sampling a first amount of charge in the floating diffusion region while the dual conversion gain transistor is deasserted. The method may also include asserting the transfer transistor after sampling the first amount of charge, and, after asserting the transfer transistor and while the control signal is equal to the third voltage, sampling a second amount of charge in the floating diffusion region while the dual conversion gain transistor is deasserted. The method may also include, after sampling the second amount of charge and while the control signal is equal to the first voltage, sampling a third amount of charge in the floating diffusion region while the dual conversion gain transistor is asserted. The method may also include resetting the floating diffusion region after sampling the third amount of charge and, after resetting the floating diffusion region and while the control signal is equal to the first voltage, sampling a fourth amount of charge in the floating diffusion region while the dual conversion gain transistor is asserted.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
   an array of imaging pixels, wherein at least one of the imaging pixels comprises:
   a photodiode;
   a floating diffusion region;
   a transfer transistor configured to transfer charge from the photodiode to the floating diffusion region; and
   a capacitor coupled to the floating diffusion region, wherein the capacitor has a plate that receives a control signal; and
   row control circuitry, wherein the row control circuitry is configured to modulate the control signal and wherein the row control circuitry is configured to provide the control signal to a first imaging pixel of the array of imaging pixels at a first voltage during a reset period for the first imaging pixel and wherein the row control circuitry is configured to provide the control signal to the first imaging pixel at a second voltage that is less than the first voltage during an integration period for the first imaging pixel.

2. The image sensor defined in claim 1, wherein the row control circuitry is configured to modulate the control signal between the first voltage, the second voltage, and a third voltage that is higher than the first voltage.

3. The image sensor defined in claim 2, wherein the first voltage is a power supply voltage.

4. The image sensor defined in claim 2, wherein the row control circuitry is configured to provide the control signal to the first imaging pixel at the third voltage during a high conversion gain readout period for the first imaging pixel and wherein the row control circuitry is configured to provide the control signal to the first imaging pixel at a fourth voltage that is less than the third voltage during a low conversion gain readout period for the first imaging pixel.

5. The image sensor defined in claim 4, wherein the fourth voltage is different from the first voltage.

6. The image sensor defined in claim 1, wherein the row control circuitry comprises a plurality of drivers and wherein each driver is configured to provide the control signal to a respective row of imaging pixels in the array of imaging pixels.

7. The image sensor defined in claim 1, wherein each of the at least one imaging pixel comprises:
   a transistor interposed between the capacitor and the floating diffusion region.

8. The image sensor defined in claim 7, wherein each of the at least one imaging pixel comprises:

a source follower transistor, wherein the floating diffusion region is coupled to a gate of the source follower transistor; and a reset transistor coupled between the floating diffusion region and a voltage supply that supplies a power supply voltage.

9. The image sensor defined in claim 8, wherein the first voltage is equal to the power supply voltage.

10. The image sensor defined in claim 7, wherein the transistor is a dual conversion gain transistor.

11. An image sensor comprising:
an array of imaging pixels, wherein at least one of the imaging pixels comprises:
a photodiode;
a floating diffusion region;
a transfer transistor configured to transfer charge from the photodiode to the floating diffusion region; and
a capacitor coupled to the floating diffusion region, wherein the capacitor has a plate that is coupled to a control line; and
row control circuitry, wherein the row control circuitry is configured to provide a control signal to the plate of the capacitor through the control line and wherein the row control circuitry is configured to modulate the control signal between a power supply voltage, a first voltage that is less than the power supply voltage, and a second voltage that is higher than the power supply voltage.

12. The image sensor defined in claim 11, wherein each of the at least one imaging pixel comprises:
a dual conversion gain transistor interposed between the capacitor and the floating diffusion region.

13. The image sensor defined in claim 11, wherein the row control circuitry is configured to provide the control signal to a first imaging pixel of the array of imaging pixels at the power supply voltage during a reset period for the first imaging pixel, wherein the row control circuitry is configured to provide the control signal to the first imaging pixel at the first voltage during an integration period for the first imaging pixel, and wherein the row control circuitry is configured to provide the control signal to the first imaging pixel at the second voltage during a high conversion gain readout period for the first imaging pixel.

14. An image sensor comprising:
an array of imaging pixels that includes a first imaging pixel in a first row of imaging pixels, the first imaging pixel comprising:
a photodiode;
a floating diffusion region;
a transfer transistor configured to transfer charge from the photodiode to the floating diffusion region; and
a capacitor that has a first plate coupled to the floating diffusion region and a second plate that is coupled to a control line; and
row control circuitry that includes a plurality of drivers, wherein a first driver of the plurality of drivers is coupled to the control line, wherein the first driver is configured to provide a control signal to the first row of imaging pixels using the control line, and wherein the first driver is configured to modulate the control signal between a first voltage and a second voltage that is less than the first voltage.

15. The image sensor defined in claim 14, wherein the control line directly couples the second plate of the capacitor to the first driver.

16. The image sensor defined in claim 14, wherein the first driver is configured to modulate the control signal between the first voltage, the second voltage, and a third voltage that is higher than the first voltage.

17. The image sensor defined in claim 16, wherein the first voltage is a power supply voltage.

18. The image sensor defined in claim 14, wherein the first driver is configured to provide the control signal to the first imaging pixel at the first voltage during a reset period for the first imaging pixel and wherein the first driver is configured to provide the control signal to the first imaging pixel at the second voltage during an integration period for the first imaging pixel.

* * * * *